United States Patent [19]

Nidola et al.

[11] 4,364,803

[45] Dec. 21, 1982

[54] DEPOSITION OF CATALYTIC ELECTRODES ON ION-EXCHANGE MEMBRANES

[75] Inventors: Antonio Nidola; Gian N. Martelli, both of Milan, Italy

[73] Assignee: Oronzio de Nora Impianti Elettrochimici S.p.A., Milan, Italy

[21] Appl. No.: 212,173

[22] Filed: Dec. 2, 1980

[51] Int. Cl.$^3$ .................... C25D 5/00; C25D 9/04; C25D 17/00

[52] U.S. Cl. ........................... 204/30; 204/38 B; 204/252; 204/283; 204/296; 427/304; 204/56 R

[58] Field of Search ............... 204/296, 283, 282, 252, 204/30, 38 B, 56 R; 427/229, 245, 306, 304

[56] References Cited

U.S. PATENT DOCUMENTS

| | | | |
|---|---|---|---|
| 1,890,645 | 12/1932 | Esch | 427/304 |
| 2,010,805 | 8/1935 | Esch | 427/304 |
| 3,222,218 | 12/1965 | Beltzer et al. | 427/304 |
| 3,351,487 | 11/1967 | Levine et al. | 427/304 |
| 3,423,228 | 1/1969 | Oster et al. | 204/29 |
| 3,513,020 | 5/1970 | West | 427/245 |
| 4,191,618 | 3/1980 | Coher et al. | 204/128 |
| 4,209,368 | 6/1980 | Coher et al. | 204/128 |
| 4,250,013 | 2/1981 | Carlin | 204/283 |
| 4,272,353 | 6/1981 | Lawrance et al. | 204/282 |

OTHER PUBLICATIONS

"SPE Process", Takenaka et al.

*Primary Examiner*—R. L. Andrews

*Attorney, Agent, or Firm*—Pollock, Vande Sande & Priddy

[57] ABSTRACT

A gas and electrolyte permeable metal layer is bonded to an ion-permeable membrane by electroless deposition to produce a permeable metal deposit upon the membrane or diaphragm. Advantageously, the membrane surface to be coated is pretreated with an amphoteric material. Thereafter, the treated surface is treated to deposit the coating. Typical metals deposited include platinum group metals, iron group metals, such as nickel, cobalt and others including gold and silver. The coatings are very thin, rarely in excess of about 50 to 100 microns.

The coated membrane may be installed in an electrolytic cell used for producing chlorine and alkali by electrolysis of alkali metal chloride with the coating serving as one electrode and another opposed electrode on or adjacent to the opposite side of the membrane. It may also be used in water electrolysis and for other purposes.

The coatings may be thickened by depositing other coatings of the same or different composition by suitable coating techniques.

Especially adherent coatings are obtained when the metal deposited upon the pretreated surface is palladium metal or a mixture of palladium with another metal. Thickening coatings deposited upon such a porous palladium coating are found to have superior adherence and durability. The metal layer may be soaked or contacted with an alkali metal or an amalgam in the presence of water to modify its crystal structure or grain size, if desired.

17 Claims, No Drawings

DEPOSITION OF CATALYTIC ELECTRODES ON ION-EXCHANGE MEMBRANES

DESCRIPTION

Technical Field

The present invention concerns new and improved electrodes, electrode-membrane systems, the process for preparing the same and the use thereof in aqueous solution electrolysis, particularly in the electrolysis of halide solutions.

Background Art

Solid electrolyte cells have long been known and utilized as fuel cells. More recently solid electrolyte cells have been developed which are suitable for water electrolysis to produce hydrogen and oxygen and for alkali metal halide electrolysis to produce halide, hydrogen and alkali metal hydroxide.

The electrodes are often comprised of a thin and porous layer of particles of a conducting and non-passivatable material, typically a metal belonging to the platinum group, or a conducting oxide of said metal, directly embedded in or otherwise bonded to the membrane surface by means of a binder, typically a polymer of trifluoroethylene and/or tetrafluoroethylene.

The electrodes are formed and bonded to the membrane surface by hot-pressing the catalyst particles and the binder.

In the particular case of sodium chloride electrolysis, the anode is often constituted by ruthenium and titanium mixed oxide particles, preferably also containing iridium, while the cathode, bonded to the opposite surface of the membrane, is often constituted by platinum black particles mixed with graphite particles.

The hot molding process for forming electrodes directly onto the membrane surface involves, however, several problems and high costs. Furthermore, during cell operation, the catalyst particles are often removed and this of course shortens the life of the electrodes due to the fact that the electrocatalytic material loss increases the cell voltage.

Chemical deposition of these porous films of electrocatalytic material, as an alternative process for preparing the electrodes, is a known procedure (see U.S. Pat. No. 3,423,228); however, this technique is rarely chosen in lieu of the above-mentioned hot molding technique, due to the fact that, though it provides highly catalytic electrodes, it involves a too high consumption of noble metals in order to obtain adequate and uniform coating of the whole membrane surface. Also, the deposit thus obtained tends to come off, especially when gas evolves at the electrode, as in the case of electrolysis of aqueous solutions.

SUMMARY OF THE INVENTION

According to the present invention, a new and improved process for forming said electrodes directly onto the surface of semipermeable membranes is provided.

According to this invention, it has surprisingly been found that by modifying the charge distribution at least on the surface of the membrane before carrying out the chemical deposition of the metal thereon, the structure of the metal coating obtained is improved, and above all the adhesion of the metal layer to the membrane surface is improved.

According to the process of the present invention, metal films are provided which are sufficiently porous to permit ready permeation by the electrolyte and by the gas bubbles evolved at the electrode-membrane electrolyte interface, while being substantially continuous and uniform and presenting high electrical conductivity. Furthermore, uniform coating of a certain electrodic surface is obtained with a minimum quantity of noble metal. Moreover, the electrodes thus formed exhibit an outstanding stability and durability, even under gas evolution conditions as encountered in the electrolysis of aqueous solutions and especially for chlorine production.

In accordance with another aspect of the present invention, uniform and continuous films of palladium can be provided even without pretreatment of the membrane with an amphoteric material.

According to another aspect of the present invention, structures are provided with metallic palladium deposited on the surface of the ion-exchange membrane and at least a second layer deposited on the palladium of at least one material from the group of platinum, nickel, nickel sulphide, nickel polysulphate, palladium sulphide, palladium polysulphide, cobalt, cobalt polysulphide or cobalt sulphide.

A further aspect of the present invention includes the changing of the grain size of a metal layer from coarser to finer, by contacting with an amalgam in the presence of water.

The present invention is also concerned with a structure comprising a polymeric ion-exchange membrane containing amphoteric groups on the surface thereof.

The present invention is also concerned with a process for providing amphoteric groups on a polymeric membrane which comprises contacting a polymeric ion-exchange membrane with a solution of an amphoteric compound capable of being sorbed by the polymeric membrane.

DESCRIPTION OF PREFERRED AND VARIOUS EMBODIMENTS

The membrane subjected to treatment is usually comprised of a thin sheet of ion-exchange resin and is substantially impervious to gas and liquid flow. Advantageously, it is constituted by a polymer of a fluorocarbon such as tetrafluoroethylene or trifluoroethylene containing ion-exchange groups, and in particular cation-exchanging groups, such as —COOH, —SO$_3$H, COONa, —SO$_3$Na, and —SO$_2$NH$_2$; although, it may contain anion-exchanging groups with or without cation-exchanging groups.

Homopolymers of fluorocarbons, copolymers of fluorocarbons with each other or with other ethylenically unsaturated monomers, and/or mixtures of such polymers can be employed if desired.

The preferred amounts of ion exchange groups in the polymeric membrane can be expressed in terms of equivalent weight of the polymer. Typical polymers particularly suitable in the electrolysis of halides have equivalent weight of about 900 to about 1500. Alternatively, the polymer can be further defined by its ion exchange capacity, preferred values of which being about 0.5 to about 4.0 milliequivalent per gram of dry polymer.

Suitable membranes for the process of the invention are widely described in various U.S. Pat. Nos. 4,065,366, 4,124,477, 3,948,373; 3,976,549; 3,282,875;

3,773,643; 4,081,349 and 4,025,405, whose descriptions are incorporated herein by reference.

Commercial membranes particularly useful for the process of the invention include membranes produced by E. I. Du Pont under the trade designation of "Nafion", by Asahi Glass (Japan) under the trade designation of "Flemion", and by Asahi Chemical (Japan) under the trade designation of "Aciplex".

The membrane thickness is generally in the range of about 0.1 to 1 millimeter.

A preferred process of the present invention includes soaking the membrane in water to full swelling, roughing the surface by wet sandblasting or other equivalent technique, and then contacting the membrane with an organic material capable of reacting both as an acid and as a base. Generally the materials contain an amine radical as well as a carboxylic or carboxyamide radicals or are water soluble metal salts thereof such as alkali metal salts thereof. Preferably, the materials used are water soluble and an aqueous solution thereof is used to effect the desired contact. For example, such an aqueous solution contains at least one of the following compounds:

sulphamic acid and its dissociation derivatives:

$$NH_2SO_3H = NH_2SO_3^- + H^+ \text{ or } H_3N^+ - SO_3^-$$

alanine and its dissociation derivatives:

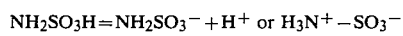

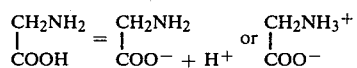

thioalanine and its dissociation derivatives:

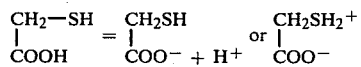

thiourea and their derivatives

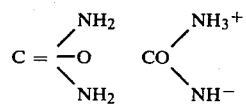

Other compounds which may be used include ammonium carbamate, urea hydrochloride and cyanuric acid.

These compounds exhibit common characteristics which can be summarized as follows:

(i) amphoteric behaviour (i.e. they act both as acid or base);
(ii) their acid character generally is stronger than their basic one;
(iii) close packing of the molecular complex (i.e. relatively small molecule);
(iv) high solubility in water.

Due to the same characteristics, they are readily adsorbed by the ion-exchange resin constituting the membrane, in the vicinity of the active sites of the resin, that is to say, in the vicinity of the ion-exchange groups contained in the membrane. In particular, in the presence of cationic membranes, the acid groups contained in the resin interact with the basic parts of the amphoteric polar groups of the above mentioned compounds to form a pseudo-dative bond. While the electronegativity of the acid groups of the membrane is not completely eliminated, the acid parts of the adsorbed compounds produce new electro-negative sites labily attached to the polymeric membrane structure.

The concepts may be graphically visualized in the following scheme, wherein the adsorption of $NH_2SO_3H$ by a polymeric membrane of the type $R—SO_3H$ is illustrated.

(i) $NH_2SO_3H$ dissociation reaction

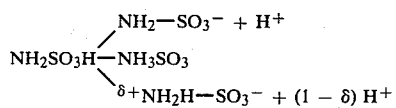

(ii) Mutual adsorption model:

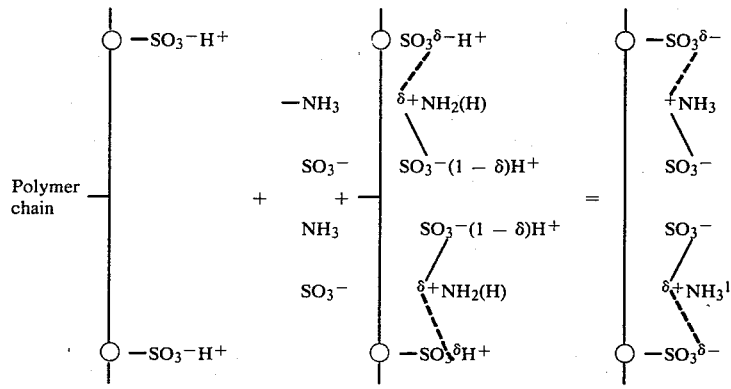

Therefore, the membrane electronegativity profile results in more uniformity and is more continuous since the basic moiety $+NH_3$ tends to slightly diminish the electronegativity of the $SO_3^-$ groups contained in the polymer, while the new adsorbed $SO_3^-$ groups give rise to as many new electronegativity sites, which are spatially intermediate among the existing $SO_3^-$ groups bound to the polymer.

The membrane is then contacted with a solution of the selected metal salt, which is adsorbed and/or absorbed in the vicinity of the membrane active sites, represented by the polar groups of the polymer itself and the polar groups pre-adsorbed.

Sorption of the metal salts takes place mainly on the membrane surface and is a function of the contact time and temperature for a certain depth from the surface exposed to contact with the solution.

When the adsorption or absorption of the metal salts or at least wetting by the solution thereof is accomplished, the membrane is soaked in a solution containing a reducing agent adherent to the membrane surface. These two last operations are repeated for a certain number of times sufficient to deposit the desired metal thickness.

It is furthermore possible to sorb first the reducing agent and then contact the membrane with the metal salt solution, but it has been found more advantageous to carry out the sorption of the metal salt before contact with the reducing agent as this makes it possible to obtain better adherence between the metal film and the membrane.

The presorbed amphoteric compounds have been found instrumental in producing a more finely dispersed and uniform deposition of the first metal layers, which is essential to obtaining good and continuous coverage of the membrane surface to be coated and an exceptionally durable bond between the membrane and the metal layer. During the repeated deposition of the additional metal layers, the sorbed groups become progressively lost in the aqueous solutions and practically none remains after a final soaking and rinsing of the coated membrane in water.

The metal salts utilized may give rise, in solution, to positive or negative metal complexes. The preferred salts are, for example, Palladium chloride ($PdCl_2$) dissolved in diluted HCl to give the anionic complex $PdCl_4^{--}$;

Palladium diamine-dinitrate ($PD(NH_3)_2(NO_2)_2$) dissolved in diluted ammonia or $NH_4Cl$ saturated solution to give the cationic complex $Pd(HN_3)_4^{++}$;

Palladium acetate ($Pd(CH_3COO)_2$) dissolved in water to give the anionic complex $PtCl_6^{--}$;

Hexachloroplatinic acid ($H_2PtCl_6$) dissolved in water to give the anionic complex $PtCl_6^{--}$;

Platinum diamine-dinitrate ($Pt(NH_3)_2(NO_2)_2$) dissolved in diluted ammonia or saturated $NH_4Cl$ solution to give the cationic complex $Pt(NH_3)_4^{++}$;

Nickel chloride ($NiCl_2$) dissolved in water to give $Ni^{++}$;

Nickel sulphate dissolved in water to give $Ni^{++}$;

Other reducible metal salts or solutions may be used as well for the process of the invention. The reducing agents utilized may be of cationic type, such as, for example, hydrazine, hydroxylamine, formamide and its derivatives, oxalic acid, alkali metal borohydrides and the like, or of the anionic type as, for example, acetic acid, citric acid, sodium hypophospite and its derivatives, or of the amphoteric type, such as acetaldehyde or formaldehyde.

According to the method of the present invention, porous films are provided which are highly adherent to the membrane surface. In fact, by modifying the charge distribution on the membrane surface, as described above, an even and fine metal distribution is achieved and therefore a lower quantity of metal is required to produce films exhibiting a good electrical continuity and adherence degree.

Examples of some suitable metals include nickel, silver, cobalt, gold, rhenium and preferably metals of the platinum group. Mixtures of metals can be employed when desired.

According to a preferred embodiment of the invention, palladium is deposited as the first coating on the membrane. It has been found that by using palladium, electrically continuous films are provided with a minimum quantity of deposited metal compared with other noble metals, such as platinum and iridium. Uniform and continuous films have been provided with palladium quantities lower or equivalent to 4 grams per square meter of surface being contacted. This improvement can be obtained at least to a substantial degree even without the pretreatment with the sulphamic acid or other amphoteric compounds as described above.

It has been found that, in order to improve the catalytic activity, especially as regards hydrogen discharge, the palladium deposit may be advantageously activated by depositing, such as by chemical vapor deposit, cathode sputtering or galvanic techniques, a further coating onto the palladium of a metal capable of providing an electrode surface such as platinum, nickel and cobalt or a coating of a conductive metal sulphide such as nickel sulphide, nickel polysulphide, cobalt sulphide, palladium sulphide or palladium polysulphide. In such an arrangement the palladium acts as the intermediate bonding layer between the electrode structure and the membrane surface.

The catalytic properties of the porous metal layer, preferably a platinum group layer and most preferably palladium, can be further improved by the changing of the metal grain size from a coarser to a finer one, by contacting the metal layer with an amalgam in the presence of water, preferably a mercury amalgam containing minor amounts of an alkali, such as about 0.001% to 0.1% by weight of sodium or lithium or an ammonium amalgam containing from 0.001% to 0.1% of ammonium. The treatment can also be with molten alkali metal or other liquid compositions containing alkali metal in liquid form. The treatment is generally for about 10 to about 60 seconds at temperatures lower than about 25° C.

During the mercury amalgam or liquid metal treatment of palladium, the color of the palladium deposit changes from silver-grey to opaque black, indicating the transformation of the deposit grain size.

Platinum or nickel deposition onto the palladium layer may be effected via chemical deposition, by soaking the membrane, coated with the adherent layer of palladium, in an aqueous solution of $H_2PtCl_6$ or $NiCl_2 \cdot 6H_2O$, respectively, and then contacting with a reducing agent such as soaking in an aqueous solution of hydrazine, $NaBH_4$, or $NaH_2PO_2$ for a few seconds, and repeating the operation for a number of times to obtain the desired amount of deposit.

Nickel sulphide is galvanically deposited by cathodically polarizing the palladium film which may also be previously coated with a thin nickel layer in an aqueous solution of $Na_2S_2O_3$ and $NiCl_2$ by means of a counter-electrode, preferably made of nickel, carrying out the electrolysis at a cathodic current density in the range of about 10 to about 80 A/m² at a temperature between about 40° and 60° C. under vigorous stirring of the electrolytic bath.

Advantageously, the nickel sulphide deposit may be converted at least partially to nickel polysulphide ($NiS_{1+x}$ where $x > 0$) by exposing the deposit to a sulphidizing atmosphere of $O_2$ containing sulphidizing amount (e.g. about 10 to 90% volume) of sulphidizing agent such as $H_2S$. The treatment is usually for about 20 to 60 minutes. The color of the deposit turns from glossy black, which is the color of nickel sulphide (NiS) to opaque black, which is the color of nickel polysulphide ($NiS_{1+x}$).

Palladium sulphide deposition onto the metal layer adherent to the membrane surface may be galvanically effected in a palladium complex salts bath containing a soluble reducible compound, such as a sulphate or thiosulphate, carrying out the electrolysis at a current density in the range of about 50 to about 300 A/m² at a temperature between about 50° and about 60° C. by cathodically polarizing the palladium film.

Preferably, the electrolytic bath is an aqueous solution containing:
from about 50 to 100 g/l sodium sulphate;
from about 10 to 20 g/l of palladium acetate or palladium iodide;
from about 1 to 5 g/l of sodium acetate.

Advantageously, also the palladium sulphide deposit may be converted at least partially to palladium polysulphide ($PdS_{1+x}$ where $x>0$) by exposing the deposit to a sulphidizing atmosphere of $O_2$ containing sulphidizing amount (e.g. about 10 to 90% by volume) sulphidizing agent such as $H_2S$. The treatment is usually for about 20 to 60 minutes.

Preferably, the palladium bonding layer preformed onto the membrane is between about 4 and about 10 g/m², more preferably between about 4 and about 6 g/m², while the catalytic layer, constituted by at least one material belonging to the group of Pt, Ni, NiS, $NiS_{1+x}$, PdS and $PdS_{1+x}$, applied onto the palladium layer, is between about 10 and about 30 g/m².

As already discussed above, in order to improve the degree of adherence of the palladium layer onto the membrane surface, the surface itself is previously roughened. A particularly suitable technique comprises sandblasting the membrane surface, previously soaked in water, with substantially spheroidal quartz particles, having a mesh size between 100 and 200 mesh.

The electrode constituted by the palladium porous layer, applied onto one side of the ion exchange membrane, whether or not activated by means of a further catalytic material top deposit, such as platinum, palladium sulphide, nickel, nickel sulphide, may act either as the cathode or the anode of the electrolysis cell. Moreover, the membrane may be coated, during the above mentioned process, on both sides to form the composite system anode-membrane-cathode, particularly suitable for water electrolysis.

In electrolysis of halides, such as for example sodium chloride, the electrode of the present invention preferably constitutes the cell cathode. The anode may be constituted by a valve metal screen, preferably titanium, coated with a layer of non-passivatable material resistant to the anodic conditions, such as, for example, an oxide or mixed oxide of at least one metal belonging to the platinum groups, preferably a ruthenium and titanium mixed oxide with a ratio between the two metals between about 2:1 and about 1:2 which may also contain minor amounts of other metal oxides.

Otherwise, the anode may be composed of a porous layer of oxide particles embedded in the anodic surface of the membrane such as polytetrafluoroethylene, according to the known technique which includes mixing the catalytic powder with the polymer powder and subsequent hot-pressing of the mixture or of a preformed decal film, onto the membrane surface.

Electric current distribution to the electrodes applied onto the membrane surface is provided by pressing against the electrodes suitable metal screens or metal grids which ensure a great number of contact points distributed all over the electrodes surface and by connecting the grids, by means of suitable connectors external to the cell, to the electric current course.

A particularly advantageous embodiment of these cells is widely described in our Italian patent application No. 24919 A/79 filed on Aug. 3, 1979, whose description is incorporated herein by reference.

In order to better illustrate the invention, some practical examples of typical embodiments of the present invention are herewith reported. It must be understood, however, that the invention is not limited to these specific embodiments.

EXAMPLE 1

Several samples of a perfluorosulphonic acid membrane available from E. I. Du Pont De Nemours under the trade designation Nafion 315 are previously soaked in boiling water for 2 to 3 hours. Nafion 315 is a laminate comprising a layer of Nafion EW 1500 and a layer of Nafion EW 1100 on a teflon screen acting as mechanical strengthener. The hydrated membranes are then disposed on a rigid support, suitably protected by a frame laid on the membrane edges, and sandblasted with quartz particles having a mesh size between 100 and 200 mesh, on the sides to be coated with the electrodic layer.

The membranes are conditioned by soaking for several hours in boiling saturated aqueous sodium salt solution (e.g. NaCl or $Na_2SO_4$) and then rinsed with deionized water.

After these treatments the membrane surfaces which are not to be coated with the metal deposit are brushed with a mixture of flax oil, glycerine and ethylene glycol in order to make them water-repellent.

The membranes are soaked in a water solution containing about 10 g/l of sulphamic acid ($NH_2SO_3H$) for about 10 to 30 minutes.

The membranes are then immersed in a water solution containing about 5g/l of $PdCl_2$, acidified with HCl up to complete solubility, for about 15 minutes and then in an aqueous solution of hydrazine containing 10% by volume of hydrazine for about 15 minutes and then rinsed with deionized water, repeating these operations for 2 to 4 times to obtain a negligible electric resistivity between two laterally spaced points on the palladium coating.

The electrode membrane systems thus prepared are designated with A.

EXAMPLE 2

One electrode-membrane system of the type A, comprised of the membrane coated on one side with a metal palladium deposit of about 10 g/m² (grams/square meter), prepared according to the procedure of Example 1, is further treated by contacting the palladium layer with mercury-sodium amalgam, having a sodium content of 0.001% by weight, in an aqueous medium for three individual periods of about 10–15 seconds.

After rinsing, the palladium deposit assumes an opaque-black color; the membrane electrode thus prepared is designated with B.

EXAMPLE 3

Other electrode-membrane systems of the type A, prepared according to the procedure of Example 1, wherein the palladium deposit is about 10 g/m², are further treated, as follows, in order to deposit palladium sulphide onto the palladium layer adherent to the membrane.

The palladium layer deposited onto the membrane is cathodically polarized with respect to a platinum counter-electrode (anode) in an aqueous deposition bath containing about 10 g/l of $Na_2S_2O_3.5H_2O$; about 53 g/l (as metal palladium ion) of $H_2Pd(CH_3COO)_3$ or $K_2PdI_4$.

The electrolysis conditions are as follows:
temperature: 40°–65° C.
cathodic current density: 100 A/m$^2$
mechanical stirring of the electrolytic bath.

A palladium sulphide deposit of about 10 to 12 g/m$^2$ is obtained in about 2 hours. The deposit color is glossy black. The membrane-electrode systems thus prepared are designated with C.

EXAMPLE 4

A membrane-electrode system prepared according to the procedure of Example 3 is furthermore treated in order to convert at least partially the palladium sulphide layer to polysulphide ($PdS_{(1+x)}$ where $x>0$), by immersing the system in an aqueous bath containing about 20 g/l of $(NH_4)_2S$, maintained at a temperature in the range of about 30° to about 35° C. and bubbling a mixture of $H_2S$ and $O_2$ (50:50 by volume) through the bath.

After 20 to 25 minutes, the deposit color turns from the glossy black of the PdS deposit to the dull black indicative of $PDS_{(1+x)}$ where $x>0$.

The membrane-electrode system is designated with D.

EXAMPLE 5

Other membrane-electrode systems of the type A, prepared according to the procedure of Example 1 and characterized by a metal palladium deposit of about 5 g/m$^2$ are further treated in order to deposit a nickel layer onto the palladium layer adherent to the membrane.

Chemical deposition of the nickel layer is carried out by immersing the membrane-electrode systems in an aqueous bath containing reducing agent insertion to convert to Ni:

| | |
|---|---|
| NiCl$_4$ | 50 g/l |
| NiSO$_4$ | 50 g/l |
| H$_3$BO$_3$ | 10 g/l |
| NaH$_2$PO$_2$ | 80 g/l | and maintained at a temperature between about 90° and about 95° C. for about 30 to about 35 minutes.

The electrode membrane systems are rinsed in water. Deposits are obtained of about 45 g/m$^2$ exhibiting a glossy grey color. The systems thus produced are designated with E.

EXAMPLE 6

Some electrode-membrane systems of the type E, produced according to the procedure of Example 5, are treated to deposit a nickel sulphide layer.

The nickel sulphide layer is galvanically deposited by cathodically polarizing the layer of palladium (5 g/m$^2$) and nickel (35 g/m$^2$) adherent to the membrane with respect to a nickel counter-electrode (anode) in an aqueous electrolytic bath containing:

| | |
|---|---|
| Na$_2$S$_2$O$_3$.5H$_2$O | 10 g/l |
| H$_2$Pd(CH$_3$OO)$_3$ | 53 g/l as metal Pd | maintained at a temperature between about 40° and about 60° C. The cathodic current density is about 150 A/m$^2$.

A deposit of about 19 g/m$^2$ of nickel sulphide, exhibiting a glossy black color, is obtained after two hours.

The membrane-electrode systems thus prepared are designated with F.

EXAMPLE 17

A membrane-electrode system of the type F, prepared according to the procedure of Example 6, is further treated in order to convert at least part of the nickel sulphide layer to nickel polysulphide ($NiS_{(1+x)}$ where $x>0$) by immersing the system in an aqueous bath containing 20 g/l of $(NH_2)_2S$ maintained at 30°–35° C. and by bubbling a mixture of $H_2S$ and $O_2$ (1:1 by volume) through the bath.

After 35 minutes, the membrane-electrode system is withdrawn and rinsed in water. The deposit has a dull-black color indicating the transformation of nickel sulphide to nickel-polysulphide, at least in the upper layer.

The membrane-electrode system thus prepared is designated with G.

EXAMPLE 8

A membrane-electrode system of the type A, prepared according to the procedure of Example 1, and characterized by a metal palladium deposit of about 10 g/m$^2$, is further treated in order to deposit a thin layer of platinum onto the palladium layer. Chemical deposition if effected by brushing an aqueous solution containing about 100 g/l of $H_2PtCl_6$ mixed with ethyl alcohol in a volumetric ratio of 1:1.

After evaporation of the solution applied, the palladium layer impregnated with platinum salt is brushed with an aqueous solution containing about 10 g/l of hydrazine ($N_2H_4$).

A deposit of about 0.5 g/m$^2$ of metal platinum is obtained on the palladium layer by repeating the above operations twice.

The membrane-electrode system thus prepared is designated with H.

EXAMPLE 9

The electrode-membrane systems prepared according to the above examples, after suitably removing the hydrophobic layer applied onto the uncoated surfaces (see Example 1) are immersed in diluted caustic soda in order to prevent membrane dehydration, are tested in a laboratory cell for sodium chloride electrolysis.

The cell is provided with an anode connected to the positive pole of the electric source, constituted by an expanded titanium sheet activated with a titanium (55%) and ruthenium (45%) mixed oxide deposit.

The membrane electrode systems are installed with the uncoated membrane facing the anode, while the electrode bonded to the opposite surface of the membrane constitutes the cell cathode.

Electric current is distributed to the cathode by pressing a nickel screen current collector or distributor against the electrodic layer. The current collector is constituted by a thin, 25 mesh, nickel screen, contacting the cathode and a resilient layer constituted by a crimped fabric made of 0.1 mm nickel wire, pressed against the nickel screen by a nickel-plated foraminous steel plate suitably connected to the negative pole of the electric current source.

The membrane provides hydraulic separation between the anodic compartment and the cathodic compartment of the cell.

Saturated brine (300 g/l of NaCl) having a pH between about 6 and about 5.5 is added to the anodic compartment bottom and diluted brine (200 g/l of NaCl having a pH between 4 and 3.5 is withdrawn together with the chlorine produced at the anode, through an outlet placed on top of the anodic compartment.

Caustic soda concentration in the cathodic compartment is maintained at 18% by recycling the catholyte outside the cell and adding water, and removing concentrated caustic soda from the circuit.

The anolyte temperature is kept at about 70° C. Current density is about 3000 A/m$^2$. The operating conditions of the membrane-cathode systems are reported on the following table, wherein, for comparison purposes, are reported also the operating conditions of a reference cell equipped with the same type of membrane (Nafion 315) without the cathodic layer and provided with a cathode of a nickel screen in contact with the membrane.

| Electrode-Membrane Sample | Electrode | Electrodic Layer Thickness g/m$^2$ | Cell Voltage V | Caustic Soda Faradic Efficiency % | Chlorides Content in Caustic Soda ppm | Electrodic Layer Weight Loss After 200 Hours mg/m$^2$ |
|---|---|---|---|---|---|---|
| A | Pd | 10 | 3.7 | 85 | 50 | non detectable |
| B | Activated Pd | 10 | 3.4 | 85 | 60 | 5 |
| C | Pd + PdS | 5 + 12 | 3.5 | 85 | 40 | non detectable |
| D | Pd + PdS + PdS$_{(1+x)}$ | 5 + 12 | 3.4 | 85 | 40 | " |
| E | Pd + Ni | 5 + 35 | 3.4 | 85 | 20 | " |
| F | Pd + Ni + NiS | 5 + 35 + 10 | 3.1 | 85 | 20 | " |
| G | Pd + Ni + NiS$_{(1+x)}$ | 5 + 35 + 10 | 3.1 | 85 | 20 | " |
| H | Pd + Pt | 10 + 0.5 | 3.1 | 85 | 30 | " |
| Reference Cell | — | — | 3.8 | 85 | 40 | — |

Although the above examples illustrate coating on one side of the membrane and use as a cathode, it is understood that anodes as well can be prepared according to the present invention and that both sides of the membrane can be coated if desired. It is noted from the above table that the practice of the present invention makes it possible to decrease the needed voltage for achieving the same yield as the reference cell which does not contain a cathode layer according to the present invention, but instead includes a nickel screen in contact with the membrane.

While the present invention has been and is described in connection with certain preferred embodiments and modifications thereof, other embodiments and modifications thereof will be apparent to those skilled in the art, and it is intended that the appended claims cover all such embodiments and modifications as are within the true spirit and scope of this invention.

What we claim is:

1. A process for producing a metal coating on the surface of a polymeric ion-exchange membrane by chemical reduction of metal ion adsorbed on the surface of the membrane wherein prior to the reduction of the metal ions, the membrane is contacted with a solution of an amphoteric compound capable of being adsorbed by the polymeric membrane.

2. The process of claim 1, wherein the amphoteric compound is a member of the group of sulphamic acid, alanine, thioalanine, urea, thiourea, ammonium carbamate, urea hydrochloride or cyanuric acid or water soluble metal salt thereof.

3. The process of claim 1, wherein the metal being deposited on the membrane is palladium.

4. The process of claim 2, wherein said salt is an alkali metal salt.

5. The process of claim 1, wherein said membrane is a fluorocarbon polymer.

6. The method of claim 1 wherein the membrane is a cation-exchange fluorocarbon polymer.

7. The process of claim 1, wherein said membrane is selected from the group of tetrafluoroethylene polymer or trifluoroethylene polymer or both and wherein said polymers contain ion-exchange groups.

8. The process of claim 7, wherein said ion-exchange groups are selected from the group of COOH, SO$_3$H, COONa, SO$_3$Na or SO$_2$NH$_2$.

9. The process of claim 1, wherein the thickness of said membrane is about 0.1 to 1 millimeter.

10. The process of claim 1, wherein said membrane is soaked in water and then roughened by wet sand-blasting.

11. The process of claim 1, wherein said amphoteric compound contains an amine radical and a radical selected from the group of carboxylic or carboxyamide or water soluble metal salt thereof.

12. The process of claim 1, wherein said metal is selected from the group of metals of platinum group, nickel, silver, gold, or rhenium or mixtures thereof.

13. The process of claim 1, wherein said amphoteric compound is sulphamic acid.

14. The process of claim 1, wherein a maximum of 4 grams of palladium are employed per square meter of surface contacted.

15. The process of claim 3, wherein palladium sulfide is deposited on to said palladium from an electrolytic bath containing:
about 50–100 g/l of sodium sulphate;
about 10–20 g/l of palladium acetate or palladium iodide;
about 1 to 5 g/l of sodium acetate.

16. The process of claim 10, wherein the surface of said membrane is roughened by sandblasting with substantially spheroidal quartz particles having a mesh size of 100 to 200 mesh.

17. An electrolytic cell which comprises a pair of opposed electrodes separated by an ion-exchange membrane, at least one of said electrodes comprising a porous continuous layer of a platinum group metal on one side of the membrane and a further electrode surface layer on the platinum metal wherein the platinum metal is deposited by chemical reduction according to the method of claim 1.

* * * * *

UNITED STATES PATENT AND TRADEMARK OFFICE
CERTIFICATE OF CORRECTION

PATENT NO. : 4,364,803

DATED : December 21, 1982

INVENTOR(S) : Antonio Nidola and Gian N. Martelli

It is certified that error appears in the above-identified patent and that said Letters Patent is hereby corrected as shown below:

```
   Title Page, column 1, after line "[22]", please insert
... [30]        Foreign Application Priority Data
        March 11, 1980  [IT] Italian      20489 A/80 ...
```

Signed and Sealed this

Twenty-eighth Day of May 1985

[SEAL]

*Attest:*

DONALD J. QUIGG

*Attesting Officer*   *Acting Commissioner of Patents and Trademarks*